UNITED STATES PATENT OFFICE.

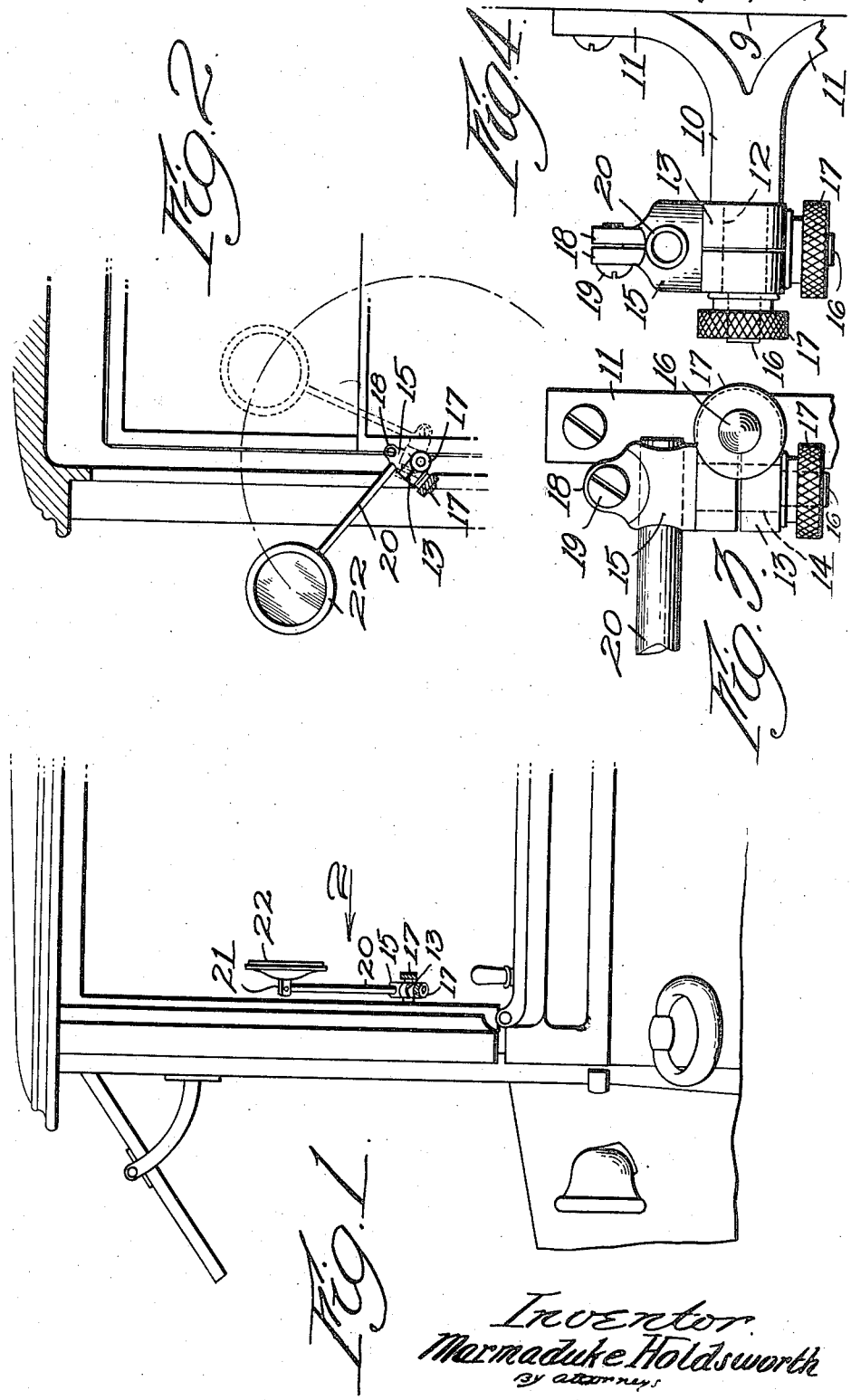

MARMADUKE HOLDSWORTH, OF WORCESTER, MASSACHUSETTS, ASSIGNOR TO ALFRED THOMAS, OF WORCESTER, MASSACHUSETTS.

MIRROR-SUPPORT FOR USE IN CLOSED CARS.

1,311,278.  Specification of Letters Patent.  Patented July 29, 1919.

Application filed September 21, 1918.  Serial No. 255,028.

*To all whom it may concern:*

Be it known that I, MARMADUKE HOLDSWORTH, a citizen of the United States, residing at Worcester, in the county of Worcester and State of Massachusetts, have invented a new and useful Mirror-Support for Use in Closed Cars, of which the following is a specification.

This invention relates to a mirror support which, while capable of general use, is particularly applicable to limousines and closed cars in general.

The principal objects of the invention are to provide a type of universal joint for adjustably supporting the mirror in such a manner that it can be mounted on the inside of a closed car and moved readily to any desired position; to provide a construction which, while practically universally adjustable, is intended to be adjusted about two axes for all practical adjustments necessary and these two are provided with means adapted to be operated without the use of tools for holding the adjustments; and also to provide a device having these advantages in a simple and inexpensive form and of such a nature as to take up very little room.

Further objects and advantages of the invention will appear hereinafter.

Reference is to be had to the accompanying drawings, in which—

Figure 1 is a side elevation of a limousine showing a preferred embodiment of this invention applied thereto;

Fig. 2 is an elevation of the front of the car from the rear showing the mirror support looking in the direction of the arrow 2 in Fig. 1;

Fig. 3 is an elevation on enlarged scale, similar to Fig. 2, of the supporting device but showing the arm for supporting the mirror in horizontal position, and Fig. 4 is a side elevation of the same.

I am aware of the fact that devices have been invented for supporting mirrors on cars and that they have been provided with joints permitting of the adjustment of the mirror into various positions, but so far as I am aware they have been arranged to support the mirror on the wind-shield or elsewhere on the outside of the car, and have not been suitable, even with any ordinary modifications, for use inside of closed cars. For that reason closed cars have been at a disadvantage in this respect. These devices also have been arranged generally so that it required the use of a wrench or screwdriver to adjust them and fasten them in adjusted positions, and have been so constructed that more parts were required than really necessary to secure the desired number of adjustments.

In order to avoid these difficulties and secure the above mentioned objects, I provide a main support or standard 10 in the form of a piece of bar stock preferably having its end split up centrally and the two projections 11 which this makes bent oppositely through an angle of 90 degrees. This provides two flat parts through which screws can be inserted to attach it to an upright or corner rod 9 of the car, as indicated in Fig. 4. These projections 11, it will be understood, are arranged in vertical position extending along the corner upright. The bar 10 itself is provided with a reduced portion 12 located permanently in horizontal position and constituting a stud on which is swiveled a split connection 13 having a passage for the stud and a second passage at right angles thereto for a second stud 14. This stud 14 therefore is capable of rotating about the horizontal stud 12 throughout an angle of 360 degrees if desired.

The stud 14 is in the form of a projection on a holder 15 which therefore is capable of tilting throughout a wide angle on that stud as an axis. Each of the studs 12 and 14 is provided with a screw-threaded end 16 having a shoulder at its end. A washer is placed on this, and a thumb-nut 17 applied to the screw-threaded end for the obvious purpose of fastening the parts in their adjusted positions. I find in practice that these two studs and thumb-nuts and their corresponding parts are all that is needed for the purpose of securing a practically universal adjustment of the mirror to be supported by the holder 15.

In order to support the mirror I perforate the holder 15 and split it between two ears 18 clear through to the perforation and put a fastening screw 19 through these ears. In the perforation I place a cylindrical arm 20, and this arm can be turned to any desired position or moved longitudinally and then the screw 19 fastened to it in that position. This is intended to be a permanent fastening because it is not desired to turn the mirror on this axis in practice after it is once adjusted so as to show what is directly behind the car. On the end of this arm is another joint at 21 for holding the mirror 22. The joint 21 also is intended to be secured in permanent position so that the occupant of the car will not have to manipulate it, although it can be adjusted if that is necessary. I prefer to make these two joints so that they can be adjusted only by the use of a screw-driver or wrench so that they will not be likely to be moved out of their original adjustment.

From what has been said, it will be seen that the main supporting stud 12 is horizontal and stationary, and that the connection 13 is capable of being turned about this axis and fastened in any adjusted position by its nut, and also that the arm 20 and its mirror can be adjusted about the transverse axis of the stud 14 whatever the position of that. Ordinarily, the arm 21 is located in vertical position and the only adjustments commonly necessary will be the adjustment about the stud 14 which is usually held in horizontal position by the nut on the stud 12. Common adjustments therefore are merely to raise and lower the range of vision without changing it laterally, and this is secured by the adjustment of the most convenient thumb-nut, namely, the one on the stud 14. This is located on the right hand for that purpose. By splitting the connection 13 it can be fastened easily so as not to slip.

If it is desired to change the range of vision sidewise, the other thumb-nut is loosened and the parts comprising the mirror, arm 20, holder 15, and connection 13 are turned about the horizontal axis of the stud 12. It is found in practice that this provides all the range of vision that is usually necessary, and furthermore the fixed adjustment, as I prefer to call it, at 19 is an important feature because having once been set in right position other adjustments may be made about the studs 12 and 14 at will, but the bringing of the arm 20 back to its natural vertical position by the manipulation of these parts will always bring the mirror into such a place that it shows the road directly behind the car.

These advantages are secured as will be seen by an extremely simple construction and by parts which are not likely to get out of order in use, or out of adjustment accidentally. I regard it as particularly important that if they do get out of adjustment either accidentally or otherwise, it is the simplest thing in the world to bring the mirror back to the right position by simply moving the parts so as to bring the arm 20 into vertical position, which is the most natural thing to do.

Although I have illustrated and described only a single embodiment of the invention, I am aware of the fact that modifications can be made therein by any person skilled in the art without departing from the scope of the invention as expressed in the claims. Therefore I do not wish to be limited to the details of construction and combinations of parts herein set forth, but what I do claim is—

1. A mirror support comprising a main frame having a stud projecting rearwardly therefrom, a connection pivoted on said stud and provided with a transverse passage, a holder having a stud in said passage and pivoted to swing thereon, an arm carried by said holder, a mirror on said arm, means whereby said arm can be adjusted axially and longitudinally and positively fixed in adjusted position, means whereby the mirror can be adjusted with respect to the arm and positively fixed in adjusted position, and thumb-nuts on the ends of said studs for readily loosening them and fastening them in adjusted positions.

2. A mirror support for a closed car comprising a main frame adapted to be fixed on the inside of one of the corner uprights of the car and having a horizontal stud, a swivel connection mounted to swing about said stud and having a passage therethrough transverse to the stud, a holder having an arm projecting therefrom and carrying a mirror and having a stud projecting at right angles to the arm and passing through said passage to constitute a pivot for the mirror, whereby the second stud, holder and mirror are capable of swinging about the first named horizontal stud and, whatever their position, the mirror and arm are capable of swinging about the second stud.

In testimony whereof I have hereunto affixed my signature.

MARMADUKE HOLDSWORTH.